(12) United States Patent
Fujita

(10) Patent No.: US 10,661,477 B2
(45) Date of Patent: May 26, 2020

(54) METHOD FOR FORMING ANCHOR HOLE AND DIAMETER EXPANSION DEVICE

(71) Applicant: FS TECHNICAL CORPORATION, Tokyo (JP)

(72) Inventor: Shogo Fujita, Tokyo (JP)

(73) Assignee: FS TECHNICAL CORPORATION, Tokyo (JP)

( * ) Notice: Subject to any disclaimer, the term of this patent is extended or adjusted under 35 U.S.C. 154(b) by 380 days.

(21) Appl. No.: 15/304,294

(22) PCT Filed: Oct. 8, 2015

(86) PCT No.: PCT/JP2015/078686
§ 371 (c)(1),
(2) Date: Oct. 14, 2016

(87) PCT Pub. No.: WO2016/080107
PCT Pub. Date: May 26, 2016

(65) Prior Publication Data
US 2017/0036373 A1 Feb. 9, 2017

(30) Foreign Application Priority Data
Nov. 20, 2014 (JP) .............................. 2014-235843

(51) Int. Cl.
 *B28D 1/14* (2006.01)
 *B24B 33/08* (2006.01)
 (Continued)

(52) U.S. Cl.
 CPC .......... *B28D 1/146* (2013.01); *B23B 51/0045* (2013.01); *B24B 23/02* (2013.01);
 (Continued)

(58) Field of Classification Search
 CPC ............ B23B 51/0045; B23B 2226/31; B23B 2226/75; B23B 2270/04; B24B 5/06;
 (Continued)

(56) References Cited

U.S. PATENT DOCUMENTS 5,462,393 A * 10/1995 Eischeid ........... B23B 29/03457
408/159
6,033,160 A * 3/2000 Heule ............... B23B 29/03432
408/153
(Continued)

FOREIGN PATENT DOCUMENTS

GB 2088756 A 6/1982
JP 2003-145332 A 5/2003
(Continued)

OTHER PUBLICATIONS

Sep. 28, 2017 Search Report issued in European Patent Application No. 15860943.8.
(Continued)

*Primary Examiner* — Timothy V Eley
(74) *Attorney, Agent, or Firm* — Oliff PLC

(57) ABSTRACT

To provide a method for forming an anchor hole and a diameter expansion device by which a centrifugal force can be appropriately adjusted when a cutting-blade portion is moved in a radial direction by the centrifugal force to grind a diameter expansion portion. In a method for forming an anchor hole for a post-installed anchor in which a diameter expansion drill bit is inserted and rotated in a prepared-hole portion bored in a concrete fixing body and a cutting-blade portion of the diameter expansion drill bit is moved in a radial direction by a centrifugal force to grind a part of the prepared-hole portion to form a diameter expansion portion,
(Continued)

the minimum value of the centrifugal force applied to grind the diameter expansion portion is 0.75 N and preferably 1.1 N.

7 Claims, 6 Drawing Sheets

(51) Int. Cl.
  *B23B 51/00* (2006.01)
  *B24B 23/02* (2006.01)
  *E04B 1/41* (2006.01)

(52) U.S. Cl.
  CPC ............ *B24B 33/08* (2013.01); *B24B 33/085* (2013.01); *B24B 33/088* (2013.01); *B28D 1/14* (2013.01); *B23B 2226/31* (2013.01); *B23B 2226/75* (2013.01); *B23B 2270/04* (2013.01); *E04B 1/41* (2013.01)

(58) Field of Classification Search
  CPC .... B24B 5/08; B24B 5/10; B24B 5/40; B24B 23/02; B24B 33/08; B24B 33/085; B24B 33/088; B24B 33/105; B28D 1/14; B28D 1/146
  See application file for complete search history.

(56) References Cited

U.S. PATENT DOCUMENTS

| | | | |
|---|---|---|---|
| 9,138,868 B2 * | 9/2015 | McDowell | B24B 5/40 |
| 9,573,238 B2 * | 2/2017 | Fujita | B28D 1/146 |
| 2002/0073813 A1 | 6/2002 | Takemura et al. | |
| 2012/0070244 A1 | 3/2012 | Stern | |
| 2013/0149058 A1 * | 6/2013 | Kelly | B23B 51/0045 408/147 |
| 2015/0165583 A1 | 6/2015 | Fujita | |
| 2017/0044756 A1 * | 2/2017 | Fujita | F16B 13/08 |
| 2017/0136654 A1 * | 5/2017 | Fujita | B24B 33/02 |

FOREIGN PATENT DOCUMENTS

| | | |
|---|---|---|
| JP | 2005-280243 A | 10/2005 |
| JP | 2014-213555 A | 11/2014 |
| WO | 2014/118771 A1 | 8/2014 |
| WO | 2014/129119 A1 | 8/2014 |

OTHER PUBLICATIONS

Dec. 8, 2015 International Search Report issued in International Patent Application No. PCT/JP2015/078686.

Dec. 8, 2015 Written Opinion issued in International Patent Application No. PCT/JP2015/078686.

* cited by examiner

F I G. 3
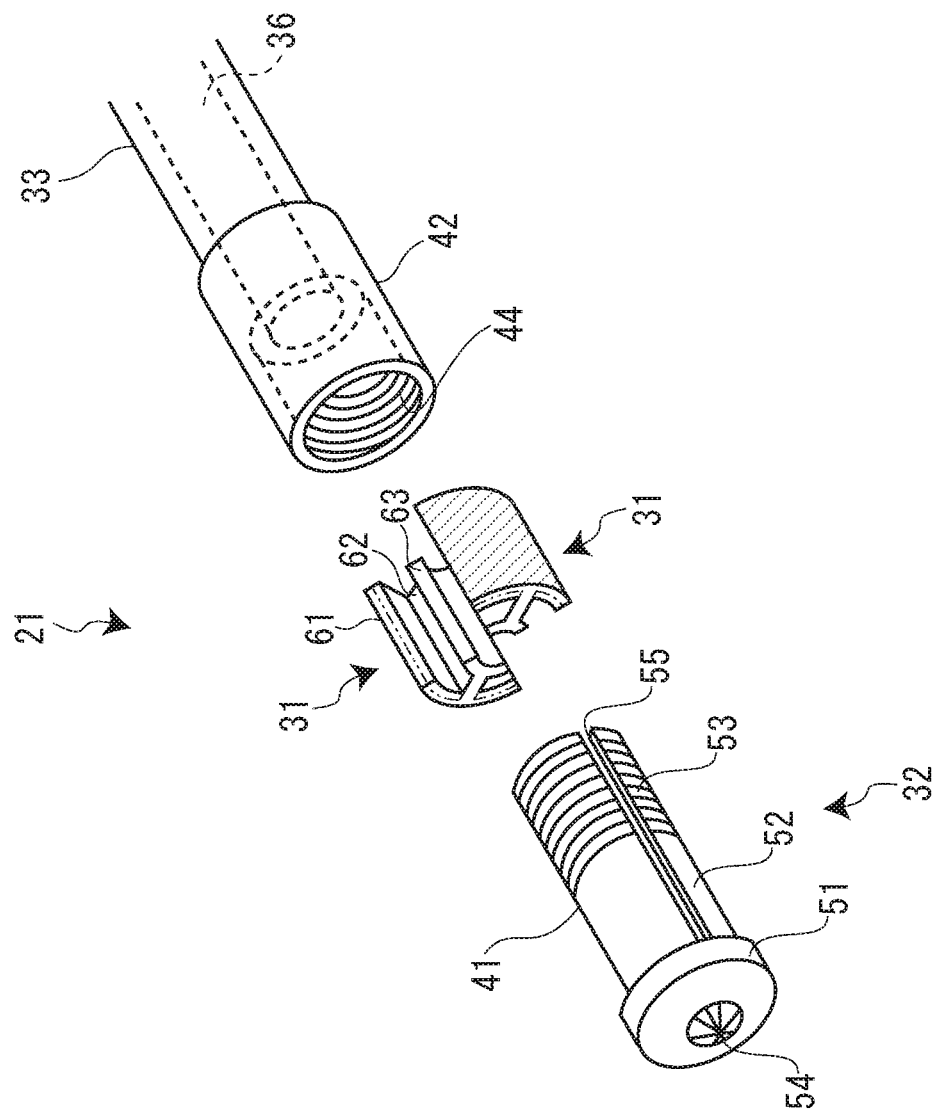

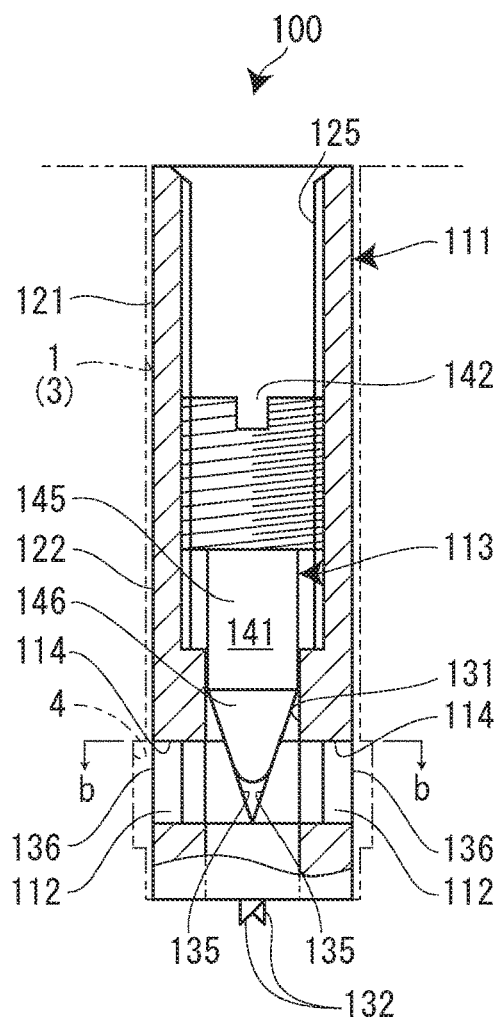 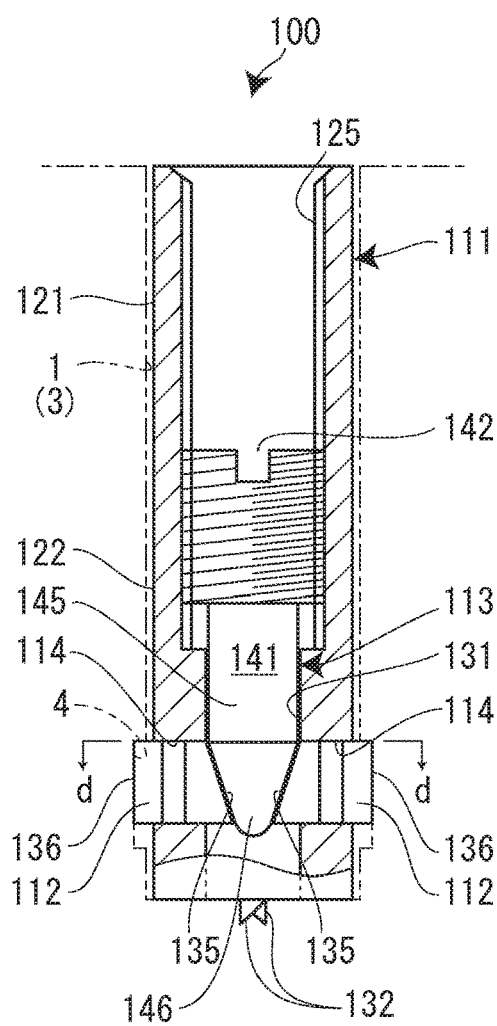
FIG. 4A  FIG. 4C
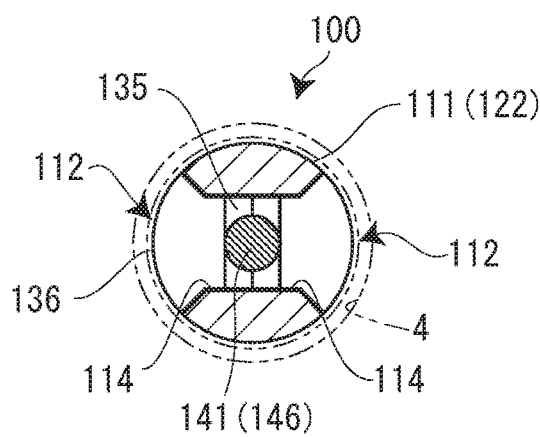 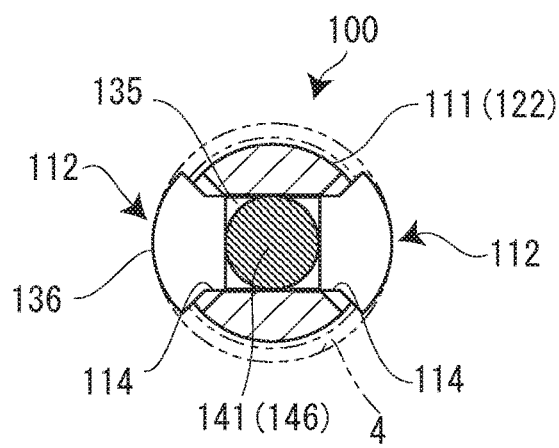
FIG. 4B  FIG. 4D

F I G. 5

EXAMINATION RESULTS OF EXPANDED DIAMETER SIZES BASED ON THE NUMBER OF REVOLUTIONS AND GRAIN SIZES

| GRAIN SIZES OF DIAMONDS \ THE NUMBER OF REVOLUTIONS OF MOTOR | 2000rpm (10sec) | 2500rpm (10sec) | 3000rpm (10sec) | 3500rpm (10sec) | 4000rpm (10sec) |
|---|---|---|---|---|---|
| #100/120 0.185φ | 0.02mm | 0.02mm | 0.17mm | 0.20mm | 0.57mm |
| #80/100 0.225φ | 0.05mm | 0.15mm | 0.23mm | 0.30mm | 0.60mm |
| #60/80 0.28φ | 0.07mm | 0.15mm | 0.35mm | 0.40mm | 0.77mm |
| #50/60 0.4φ | 0.07mm | 0.22mm | 0.63mm | 0.70mm | 0.90mm |
| #40/50 0.6φ | 0.07mm | 0.23mm | 0.80mm | 0.97mm | 1.57mm |
| #30/40 0.75φ | 0.20mm | 0.23mm | 0.97mm | 1.00mm | 1.67mm |
| #20/30 0.85φ | 0.20mm | 0.70mm | 1.00mm | 1.10mm | 1.70mm (MAXIMUM) |
| #18/20 1.0φ | 0.20mm | 0.80mm | 1.10mm | 1.50mm | 1.70mm (MAXIMUM) |
| #16/18 | 0.20mm | 0.92mm | 1.10mm | 1.70mm (MAXIMUM) | 1.70mm (MAXIMUM) |

- DIAMETER OF CUTTING-BLADE PORTION : 13.3mm (PADIUS 6.65mm)
- DIAMETER OF PREPARED-HOLE PORTION : 14.1mm (PADIUS 7.05mm)
- CLEARANCE : 0.4mm
- WEIGHT OF CUTTING-BLADE PORTION : 1.91g
- CENTER OF GRAVITY OF CUTTING-BLADE PORTION : 5.7mm

METHOD FOR FORMING ANCHOR HOLE AND DIAMETER EXPANSION DEVICE

TECHNICAL FIELD

The present invention relates to a method for forming an anchor hole into which a post-installed anchor is anchored and, in particular, to a method for forming an anchor hole and a diameter expansion device for forming a diameter expansion portion in a part of a prepared-hole portion.

BACKGROUND ART

Conventionally, as such a method for forming an anchor hole in which a diameter expansion portion is formed in apart of a prepared-hole portion, there has been known a method using an undercut drill device (see Patent Document 1). In this case, a resin-based anchor is anchored into the anchor hole, and the prepared hole is formed to have a relatively large diameter (a diameter of about 90 mm or more).

The undercut drill device has a hollow cylindrical barrel body inserted in the prepared hole, a putting member that is mounted on the opening edge of the prepared hole and rotatably supports the barrel body via a bearing, a shaft that slidably engages with the barrel body on the same axis and integrally rotates with the barrel body, a truncated-cone-shaped cone portion that is provided on the tip-end side of the barrel body and has four guide grooves on its outer peripheral surface, four arms that are attached to the tip end of the shaft and engage with the respective guide grooves, and two cutting blades and two guide portions alternately provided on the tip-end outer surfaces of the four arms.

The cutting blades and the guide portions are positioned inside the barrel body when the shaft is pulled up. When the barrel body and the shaft inserted in the prepared hole are integrally rotated and the shaft is moved downward, the four arms move downward and spread to an outside through the guide grooves of the cone portion. Thus, the cutting blades grind the inner peripheral surface of the prepared hole to form a diameter expansion portion at the bottom part (the deepest part) of the prepared hole.

[Patent Document 1] JP-A-2005-280243

DISCLOSURE OF THE INVENTION

Problems that the Invention is to Solve

The above method for forming the diameter expansion portion with the conventional undercut drill device gives rise to the problem that the undercut drill device can be applied to a prepared hole (anchor hole) having a large diameter for a resin-based anchor but cannot be applied to a prepared hole (anchor hole) having a small diameter for a metal expansion anchor since the configuration of the device is complicated.

For example, the barrel body and the shaft can be integrated with each other in such a manner that the four arms are opened to the outside by a centrifugal force. As a result, the configuration of the device can be simplified as a whole. However, even if the undercut drill device can be adapted to a prepared hole (anchor hole) having a small diameter in the manner described above, it is not possible to grind the prepared hole to form the diameter expansion portion unless a centrifugal force is sufficiently applied to the respective arms. Otherwise, it is not possible to form the diameter expansion portion in a short time commensurate with operation efficiency since the grinding of the prepared hole is time-consuming.

The size of a centrifugal force is determined according to the parameters of the weight, the turning radius, and the angular speed of a target to which the centrifugal force is applied. Among them, the weight and the turning radius are restricted by the diameter of a formed anchor hole. In addition, the angular speed is restricted by the number of the revolutions of a drill main-body.

The present invention has an object of providing a method for forming an anchor hole and a diameter expansion device by which a centrifugal force can be appropriately adjusted when a cutting-blade portion is moved in a radial direction by the centrifugal force to grind a diameter expansion portion.

Means for Solving the Problems

The present invention provides a method for forming an anchor hole for a post-installed anchor in which a diameter expansion drill bit inserted in a prepared-hole portion bored in a concrete fixing body is rotated and a cutting-blade portion of the diameter expansion drill bit is moved in a radial direction by a centrifugal force to grind a part of the prepared-hole portion to form a diameter expansion portion, wherein a minimum value of the centrifugal force applied to grind the diameter expansion portion is 0.75 N.

In this case, the minimum value of the centrifugal force applied to grind the diameter expansion portion is preferably 1.1 N.

According to these configurations, a diameter expansion portion having an expanded diameter size of 0.3 mm or more (having a grinding depth of 0.15 mm or more) can be formed in a prepared-hole portion. That is, when a centrifugal force applied to grind a diameter expansion portion is set at 0.75 N representing a minimum value and more preferably set at 1.1 N, a diameter expansion portion can be appropriately formed in a prepared-hole portion in a short time.

In addition, the diameter expansion drill bit preferably rotates at 2500 rpm or more and 40000 rpm or less.

In this case, the diameter expansion drill bit preferably rotates at 9000 rpm or more and 20000 rpm or less.

According to the configuration, the expanded diameter size of a diameter expansion portion can be set at 0.5 mm or more with respect to a prepared-hole portion when the diameter expansion drill bit rotates at 2500 rpm or more and 40000 rpm or less and more preferably rotates at 9000 rpm or more and 20000 rpm or less. In addition, a diameter expansion portion can be appropriately formed when a commercially-available electric drill is used as the power source of the diameter expansion drill bit.

Moreover, the diameter expansion drill bit preferably rotates and drives for five seconds or more and 20 seconds or less to form the diameter expansion portion.

According to the configuration, a diameter expansion portion can be formed in a short time and with excellent operation efficiency when the diameter expansion drill bit rotates and drives for five seconds or more and 20 seconds or less to form the diameter expansion portion.

On the other hand, the cutting-blade portion is preferably constituted by a diamond cutting-blade having a grain size of 100-120 mesh or more and 16-18 mesh or less.

In this case, the cutting-blade portion is preferably constituted by a diamond cutting-blade having a grain size of 50-60 mesh or more and 16-18 mesh or less.

According to these configurations, the inner peripheral surface of a prepared-hole portion can be efficiently ground even if a centrifugal force applied to the cutting-blade portion is relatively small. In particular, the cutting-blade portion preferably has a grain size of 50-60 mesh or more and 16-18 mesh or less in consideration of the grinding performance and the costs of the diamond cutting-blade.

The present invention provides a diameter expansion device having a diameter expansion drill bit used for the method for forming the anchor hole described above and an electric drill that rotates the diameter expansion drill bit, wherein the diameter expansion drill bit has a plurality of cutting-blade portions that grinds the diameter expansion portion, a cutting-blade holding portion that movably holds the plurality of cutting-blade portions in a radial direction, and a shank portion that supports the cutting-blade holding portion, and the plurality of cutting-blade portions is moved by a centrifugal force resulting from the rotation so as to spread to an outside in the radial direction with respect to the cutting-blade holding portion.

According to the configuration, the plurality of cutting-blade portions of the bit portion receives a centrifugal force and moves to the outside in the radial direction when the shank portion inserted in a prepared-hole portion is rotated. That is, the plurality of cutting-blade portions rotating with the cutting-blade holding portion is moved by a centrifugal force so as to spread to the outside in the radial direction and grinds a part of a prepared-hole portion to expand its diameter. In this case, the structure can be simplified since the plurality of cutting-blade portions is configured to be moved by a centrifugal force. Moreover, the diameter expansion device can be adapted to (can expand the diameter of) a prepared-hole portion having a small diameter since the plurality of cutting-blade portions inserted in the prepared-hole portion can be arranged so as to be put together with the cutting-blade holding portion in the radial direction.

BRIEF DESCRIPTION OF THE DRAWINGS

FIG. 3 is an exploded perspective view of the bit portion and its surroundings of a diameter expansion drill bit.

FIGS. 4A to 4D are structural views of a post-installed anchor anchored into the anchor hole according to the embodiment.

FIG. 5 is a diagram showing the examination results of the expanded diameter sizes of the diameter expansion portion when the number of the revolutions of the diameter expansion drill bit and the grain size of the diamonds of cutting-blade portions are changed.

DESCRIPTION OF EXEMPLARY EMBODIMENTS

Hereinafter, a description will be given, with reference to the accompanying drawings, of a method for forming an anchor hole and a diameter expansion device according to an embodiment of the present invention. The anchor hole has a diameter expansion portion on the back side of its prepared-hole portion and is formed (bored) in a fixing body made of concrete such as a concrete frame. Hereinafter, with the detailed description of the shape of the anchor hole, a description will be given of a diameter expansion device having a diameter expansion drill bit for forming the diameter expansion portion of the anchor hole and a dedicated post-installed anchor (metal expansion anchor) anchored into the anchor hole.

Figure 1:
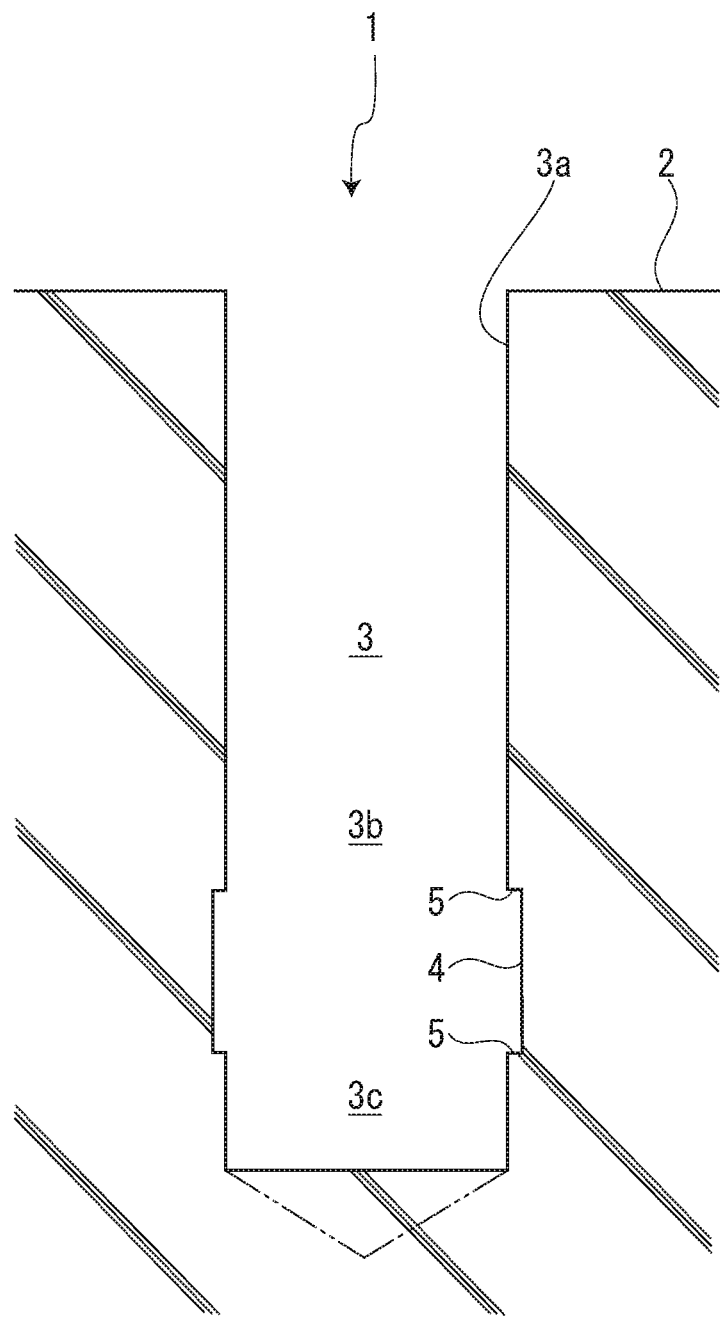
FIG. 1 is a cross-sectional view of an anchor hole according to an embodiment.

FIG. 1 is a cross-sectional view of the anchor hole according to the embodiment. As shown in the figure, an anchor hole 1 is formed in a fixing body 2 made of concrete (for example, a concrete frame or a concrete base). The anchor hole 1 has a straight-shaped prepared-hole portion 3 bored in the fixing body 2 and a diameter expansion portion 4 formed at the back (tip end) of the prepared-hole portion 3 to have a larger diameter than that of the prepared-hole portion 3. The diameter expansion portion 4 is constituted by a cylindrical portion having annular step portions 5 at two spots and protruding outwardly from the prepared-hole portion 3. In addition, the prepared-hole portion 3 has, across the diameter expansion portion 4, a long opening-side hole portion 3b on the side of an opening 3a and a short bottom-side hole portion 3c on the side of a hole bottom.

In this case, the prepared-hole portion 3 is bored by a core drill, a vibration drill, a hammer drill, or the like. In addition, the diameter expansion portion 4 is formed by a diameter expansion device 10 having a diameter expansion drill bit 20 that will be described later. Note that the diameter expansion portion 4 may be formed into a conical cylindrical shape.

Figure 2:
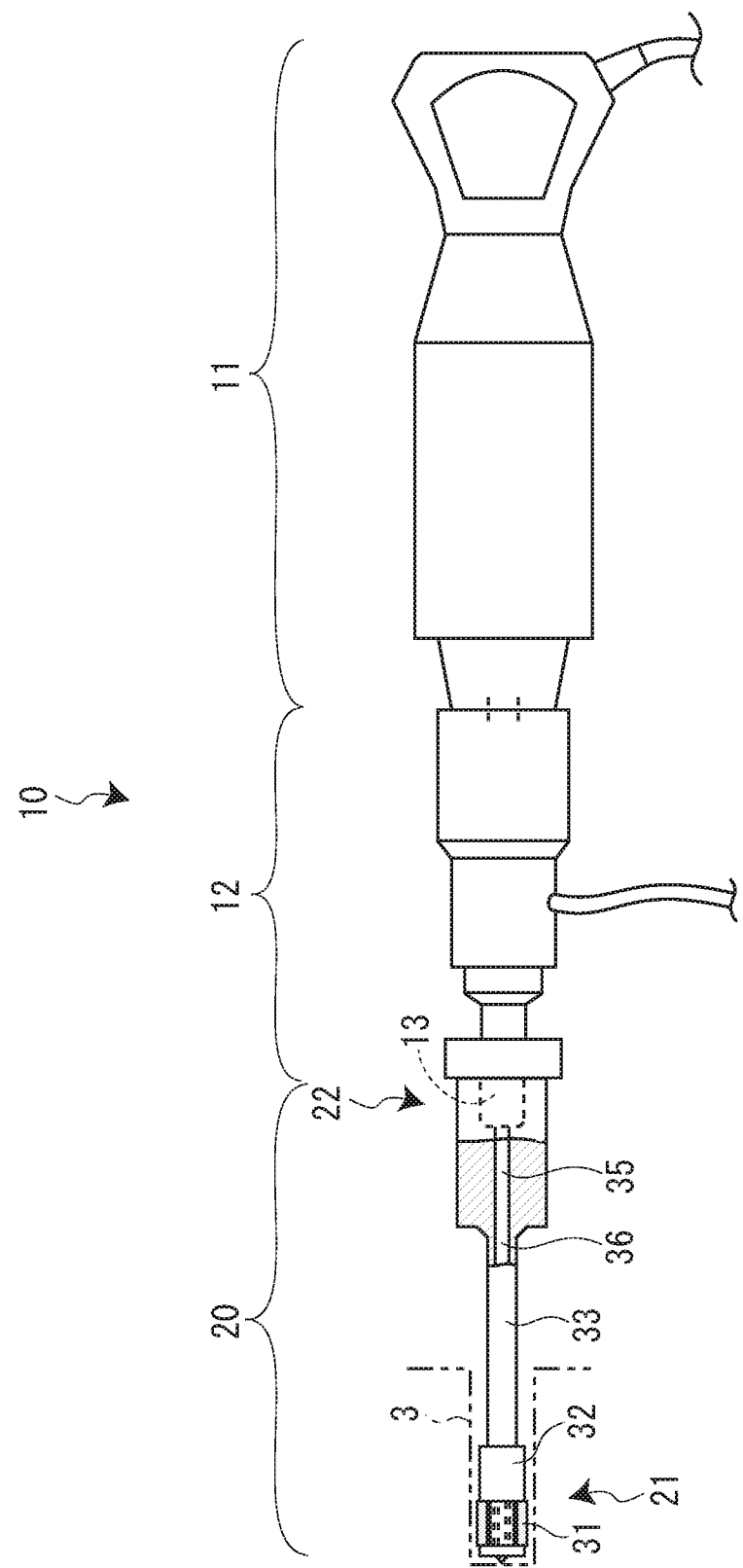
FIG. 2 is a structural view of a diameter expansion device used to form the diameter expansion portion of the anchor hole according to the embodiment.

Next, a description will be given of the diameter expansion device 10 with reference to FIGS. 2 and 3. FIG. 2 is a structural view of the diameter expansion device 10 having the diameter expansion drill bit 20, and FIG. 3 is an exploded perspective view of the bit portion and its surroundings of the diameter expansion drill bit 20. As shown in both figures, the diameter expansion device 10 has a hand-held electric drill 11 serving as a power source, a cooling-liquid attachment 12 attached to the electric drill 11, and the diameter expansion drill bit 20 attached to the cooling-liquid attachment 12. That is, the diameter expansion drill bit 20 is detachably attached to a rotation shaft 13 provided at the tip end of the cooling-liquid attachment 12.

The rotation shaft 13 has a flow path for cooling liquid, and the cooling-liquid attachment 12 is connected to a cooling-liquid supply device not shown. The cooling liquid is supplied from the cooling-liquid supply device to the diameter expansion drill bit 20 via the cooling-liquid attachment 12. The diameter expansion device 10 of the embodiment bores the prepared-hole portion 3 with a boring drill bit (for example, a diamond core bit) attached to the cooling-liquid attachment 12, and then preferably uses the diameter expansion drill bit 20 instead of the boring drill bit to expand a back part of the prepared-hole portion 3.

The diameter expansion drill bit 20 has a bit portion 21 that expands the diameter of the prepared-hole portion 3 at its tip end, and has a shaft portion 22 that is detachably attached to the rotation shaft 13 (the cooling-liquid attachment 12) on the side of the electric drill 11 on its base-end side and that supports the bit portion 21 so as to be coaxial at a base on its tip-end side.

The bit portion 21 has two cutting-blade portions 31 that grind the prepared-hole portion 3, a cutting-blade holding portion 32 that movably holds the two cutting-blade portions 31 in a radial direction, and a shank portion 33 that supports the two cutting-blade portions 31 via the cutting-blade holding portion 32. When the diameter expansion drill bit 20 is rotated by the electric drill 11 in a state in which the bit portion 21 is inserted in the prepared-hole portion 3, the two cutting-blade portions 31 are caused to spread (move) to an outside in the radial direction by a centrifugal force.

The shaft portion 22 is threadedly engaged with the rotation shaft 13 of the cooling-liquid attachment 12 at its small cut end. The shaft portion 22 has an intra-shaft flow path 35 for the cooling liquid at its shaft center. The intra-shaft flow path 35 communicates with the cooling-liquid attachment 12 on its base-end side and communicates with an intra-bit flow path 36 that will be described later on its tip-end side.

As shown in FIG. 3, the bit portion 21 has the shank portion 33 extending from the tip end of the shaft portion 22, the cylindrical cutting-blade holding portion 32 provided at the tip end of the shank portion 33, and the two cutting-blade portions 31 held by the cutting-blade holding portion 32 as described above. In this case, the outer diameter of the two cutting-blade portions 31 is formed to be slightly smaller than the inner diameter of the prepared-hole portion 3. In addition, the outer diameter of the cutting-blade holding portion 32 is formed to be the same as or slightly smaller than the outer diameter of the two cutting-blade portions 31. On the other hand, the intra-bit flow path 36 communicating with the above intra-shaft flow path 35 is arranged at the shaft center of the shank portion 33 and inside the cutting-blade holding portion 32. The cooling liquid introduced into the intra-bit flow path 36 is discharged from two slit portions 55 of the cutting-blade holding portion 32 that will be described later to the two cutting-blade portions 31 inside the prepared-hole portion 3.

The cutting-blade holding portion 32 has a holding-portion main-body 41 that holds the two cutting-blade portions 31 so as to be parallel to its outer peripheral surface, and has a holding-portion receiver 42 to which the holding-portion main-body 41 is attached. The holding-portion receiver 42 is joined to the shank portion 33 on its base-end side and has a female screw 44 threadedly engaged with the holding-portion main-body 41 on an inner peripheral surface on its tip-end side. In the embodiment, the holding-portion receiver 42, the shank portion 33, and the shaft portion 22 are integrally formed.

The holding-portion main-body 41 has a tip-end flange portion 51 formed into a flange shape, a cylindrical holding portion 52 connected to the tip-end flange portion 51 and holding the two cutting-blade portions 31, and a cylindrical screw portion 53 connected to the cylindrical holding portion 52. In addition, the holding-portion main-body 41 has a spire portion 54 provided at the central tip-end of the tip-end flange portion 51 and the two slit portions 55 formed in the areas of the cylindrical holding portion 52 and the cylindrical screw portion 53. In this case, the tip-end flange portion 51, the cylindrical holding portion 52, the cylindrical screw portion 53, and the spire portion 54 are integrally formed. Note that the spire portion 54 is bumped against the hole bottom of the prepared-hole portion 3 to prevent the rotational fluctuations of the bit portion 21.

The tip-end flange portion 51 and the holding-portion receiver 42 are formed to have the same diameter and arranged so as to sandwich the cutting-blade portions 31 held by the cylindrical holding portion 52 with a slight gap therebetween in a shaft direction. As will be described in detail later, the respective cutting-blade portions 31 are held by the cylindrical holding portion 52 via the slit portions 55. In this state, the cylindrical screw portion 53 is threadedly engaged with the female screw 44 of the holding-portion receiver 42. In addition, the two slit portions 55 are formed at positions point-symmetrically by 180° in the peripheral direction of the cylindrical holding portion 52 and the cylindrical screw portion 53.

The respective cutting-blade portions 31 have a cutting-blade main-body 61 provided so as to be parallel to the outer peripheral surface of the cutting-blade holding portion 32, a rib portion 62 protruding from the inside of the cutting-blade main-body 61, and a drawing preventing portion 63 provided at the tip end of the rib portion 62. The cutting-blade main-bodies 61 and the drawing preventing portions 63 have a substantially ¼ arc shape in cross section, and the rib portions 62 slidably engage with the slit portions 55 in the radial direction.

Accordingly, the two cutting-blade portions 31 held by the cutting-blade holding portion 32 are caused to spread to the outside in the radial direction so as to move in parallel by a centrifugal force generated by the rotation. That is, the inner surfaces of the cutting-blade main-bodies 61 contact the above outer peripheral surface of the cylindrical holding portion 52 when the cutting-blade portions 31 are brought into the initial state of the their spreading, and the outer surfaces of the drawing preventing portions 63 contact the inner peripheral surface of the cylindrical holding portion 52 when the cutting-blade portions 31 are brought into the end state of the their spreading.

The cutting-blade main-bodies 61 are constituted by a diamond cutting-blade having an arc shape in cross section and have a grinding diamond at their outer peripheral portion. Thus, the back-side inner peripheral surface of the prepared-hole portion 3 is ground to have a prescribed expanded diameter size. Note that the diameter of the two cutting-blade portions 31 is formed to be smaller than the diameter of the prepared-hole portion 3 by about 0.5 to 1.0 mm when the cutting-blade portions 31 are brought into the initial state, whereby the bit portion 21 can be smoothly inserted in the prepared-hole portion 3. Note that the cutting-blade main-bodies 61 may be replaced by cutting blades made of metal such as cemented carbide.

In a diameter expansion operation using the diameter expansion drill bit 20, the diameter expansion drill bit 20 is first attached to the diameter expansion device 10, and the bit portion 21 is then inserted in the prepared-hole portion 3. When the bit portion 21 is inserted so as to cause the spire portion 54 to be bumped against the bottom-side hole portion 3c of the prepared-hole portion 3, the electric drill 11 is driven to rotate the diameter expansion drill bit 20. Simultaneously with or before or after the rotation of the diameter expansion drill bit 20, the cooling liquid is supplied to the cutting-blade portions 31 via the intra-shaft flow path 35 and the intra-bit flow path 36.

When the diameter expansion drill bit 20 rotates, a centrifugal force is applied to the two cutting-blade portions 31. As a result, the two cutting-blade portions 31 spread to the outside. In addition, the cooling liquid discharged from the tip end of the intra-bit flow path 36 is also caused to spread radially inside the two cutting-blade portions 31 by the centrifugal force, which accelerates the spreading of the cutting-blade portions 31. Thus, as the cutting-blade main-bodies 61 of the rotating bit portion 21 grind the inner surface of the prepared-hole portion 3, the diameter expansion portion 4 is formed at a back part of the prepared-hole portion 3. After that, when the drawing preventing portions 63 are restricted in their positions by holding-portion main-body 41 or when a prescribed time elapses, the diameter expansion portion 4 has a prescribed expanded diameter size.

As described above, the diameter expansion portion 4 can be formed in the prepared-hole portion 3 easily and in a short time in such a manner that the bit portion 21 is only inserted and rotated in the prepared-hole portion 3. In addition, the configuration of the device can be simplified since the two cutting-blade portions 31 are caused to spread by a centrifugal force. Moreover, the diameter expansion portion 4 can be appropriately formed even in the prepared-hole portion 3 having a small diameter since the two cutting-blade portions 31 can be arranged so as to be put together with the cutting-blade holding portion 32 in the radial direction.

Note that the cooling liquid is supplied via the cooling-liquid attachment 12 to bore the prepared-hole portion 3 and grind the diameter expansion portion 4 in the embodiment (wet type). However, the cooling liquid is not necessarily used (dry type). For example, it may be possible to use a vibration drill or a hammer drill to bore the prepared-hole portion 3 and directly attach the diameter expansion drill bit 20 to the electric drill 11 to grind the diameter expansion portion 4.

Next, a description will be given, with reference to FIGS. 4A to 4D, of a post-installed anchor fixed (anchored) into the anchor hole 1 thus formed.

FIGS. 4A to 4D are structural views of a post-installed anchor. As shown in the figures, a post-installed anchor 100 has a cylindrical anchor main-body 111 that is inserted in the anchor hole 1, two spread pieces 112 provided on the side of the tip end of the anchor main-body 111, and a cone portion 113 that spreads the two spread pieces 112 from an inside. In addition, the post-installed anchor 100 has two guide opening portions 114 that slidably support the plurality of spread pieces 112 at the position of the anchor main-body 111 corresponding to the diameter expansion portion 4 when the anchor main-body 111 is inserted in the anchor hole 1.

That is, at the lower portion of the anchor main-body 111 corresponding to the diameter expansion portion 4, the two guide opening portions 114 are formed so as to cross the shaft direction of the anchor main-body 111, and the two spread pieces 112 are slidably supported by the two guide opening portions 114. In this case, the anchor main-body 111 and the two spread pieces 112 are separately formed, and these members and the cone portion 113 are also separately formed. Further, the anchor main-body 111, the two spread pieces 112, and the cone portion 113 are made of soft steel, stainless steel, or the like and constitute a so-called metal expansion anchor.

The anchor main-body 111 is formed into a cylindrical shape having a stepped inner peripheral surface and integrally formed by a base-end-side bolt support portion 121 to which a joining bolt or the like (not shown) is attached and a tip-end-side frame fixing portion 122 fixed to the concrete fixing body 2.

The bolt support portion 121 has a female-screw portion 125 on its inner peripheral surface. A male-screw portion 142 of the cone portion 113 that will be described later is threadedly engaged with the female-screw portion 125, and the joining bolt (generally, any bolt) such as a hanging bolt and a connecting bolt for a support target is screwed into the female-screw portion 125. That is, the cone portion 113 is threadedly engaged with the female-screw portion 125, and the joining bolt is attached to the female-screw portion 125 after the anchor main-body 111 is fixed (anchored) into the anchor hole 1.

The inner peripheral surface of the frame fixing portion 122 has a loose-insertion hole 131 that is connected to the above female-screw portion 125 and causes a cone-portion main-body 141 of the cone portion 113 that will be described later to be loosely inserted therein. In addition, the frame fixing portion 122 has the above two guide opening portions 114 formed so as to cross its shaft direction. The respective guide opening portions 114 are formed to penetrate in the radial direction of the frame fixing portion 122 and arranged at positions point-symmetrically by 180°. In addition, the respective guide opening portions 114 are formed into a shape complementary to the spread pieces 112. Further, in the two guide opening portions 114, the two spread pieces 112 engaged to the diameter expansion portion 4 are slidably held in the radial direction.

Moreover, at the tip end of the frame fixing portion 122, i.e., at the tip end of the anchor main-body 111, two rotation preventing protrusions 132 are formed. The two rotation preventing protrusions 132 protrude from the tip end of the anchor main-body 111 at positions point-symmetrically by 180°. The respective rotation preventing protrusions 132 have an acute tip-end and prevent the anchor main-body 111 from rotating with the cone portion 113 when the male-screw portion 142 (the cone portion 113) is fastened.

The two spread pieces 112 are formed into a rectangular shape in cross section and each slidably held by the above guide opening portions 114. Therefore, the two spread pieces 112 are arranged at positions point-symmetrically by 180° and arranged at positions at which the two spread pieces 112 correspond to the diameter expansion portion 4 when the post-installed anchor 100 (the anchor main-body 111) is inserted in the anchor hole 1. The respective spread pieces 112 are formed to have a fan shape in plan view at their half portions on tip-end sides in the radial direction. Specifically, the half portions on the tip-end sides of the spread pieces 112 are formed to have an opening angle of 90° about the center of the anchor main-body 111.

On the other hand, the inner ends of the respective spread pieces 112 that face the cone portion 113 have a slant surface 135 following (having the same angle as) the tapered angle of the cone portion 113 (see FIGS. 4A and 4C). Since the inner ends of the spread pieces 112 are formed to have the flat slant surface (see FIG. 4B), the cone portion 113 linearly contacts the spread pieces 112 at one spot and slides the same to an outside in the radial direction.

On the other hand, the outer ends (engagement-side ends) of the respective spread pieces 112 that face the diameter expansion portion 4 have an arc surface 136 following the outer peripheral surface of the anchor main-body 111 (the frame fixing portion 122) (see FIG. 4B). Further, the respective spread pieces 112 are temporarily fixed to the anchor main-body 111 so as not to protrude from the outer peripheral surface of the anchor main-body 111. Note that the spread pieces 112 have any cross-sectional shape such as a circle and a triangle.

The cone portion 113 has a cone-portion main-body 141 that slides the two spread pieces 112 to the outside in the radial direction, and has a male-screw portion 142 threadedly engaged with the above female-screw portion 125 to squeeze the cone-portion main-body 141. The cone-portion main-body 141 and the male-screw portion 142 are integrally formed. When the male-screw portion 142 is screwed, the cone-portion main-body 141 advances in its rotating state and is then squeezed between the two spread pieces 112.

The male-screw portion 142 is formed to be, for example, a male screw with a tool groove. In the post-installed anchor 100 of the embodiment, the male-screw portion 142 is screwed by, for example, a driver drill with a torque clutch to which a driver bit is attached.

The cone-portion main-body 141 has a barrel portion 145 connected to the male-screw portion 142 and a tapered portion 146 connected to the barrel portion 145. The tapered portion 146 is formed into an inverted truncated cone shape with its tip end chamfered like a spherical crown, i.e., it is formed into a tapered shape. The tapered angle of the tapered portion 146 is set at an angle at which the respective spread pieces 112 move from their fixed positions to press-contact positions, and set at a relatively steep angle. When the male-screw portion 142 is screwed by the driver drill as described above, the two spread pieces 112 each slide to the outside in the radial direction.

As described above, the two spread pieces 112 are slidably supported by the guide opening portions 114 in the post-installed anchor 100. Therefore, the respective spread pieces 112 can be easily slid in the radial direction in such a manner that the cone portion 113 is only screwed at a relatively small torque. That is, the anchoring operation can be easily and stably performed regardless of the skills of an operator. In addition, since the two protruding spread pieces 112 are engaged to the diameter expansion portion 4 so as to be caught, high drawing strength can be reliably maintained.

Meanwhile, the diameter expansion drill bit 20 that forms the diameter expansion portion 4 in the anchor hole 1 using a centrifugal force applied to the cutting-blade portions 31 is restricted by the weights and the turning radius of the cutting-blade portions 31. Therefore, it is necessary to increase the number of the revolutions of the diameter expansion drill bit 20 to obtain a sufficient centrifugal force. The number of the revolutions of the diameter expansion drill bit 20 depends on the number of the revolutions of the electric drill 11. Therefore, when it is assumed to use a commercially-available one as the electric drill 11, the number of the revolutions of the diameter expansion drill bit 20 is also restricted. In addition, from the viewpoint of smoothly grinding the prepared-hole portion 3 with a relatively small centrifugal force, it is also necessary to give consideration to the grain size of the diamonds of the cutting-blade portions 31.

Accordingly, in the embodiment, the following examination was conducted in order to appropriately adjust a centrifugal force applied to the cutting-blade portions 31 and appropriately adjust the number of the revolutions of the diameter expansion drill bit 20 and the grain size of the diamonds of the cutting-blade portions 31 in association with the appropriate adjustment of the centrifugal force.

Figure 6A:
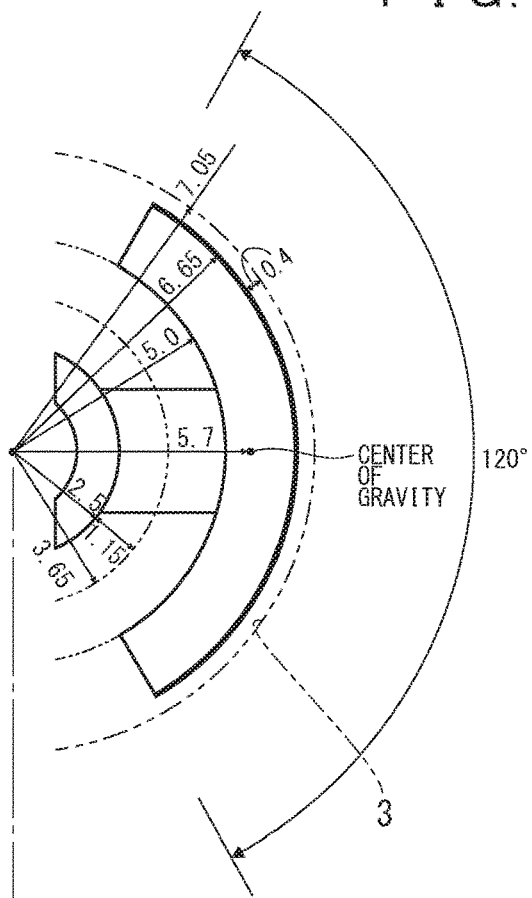
FIGS. 6A and 6B are dimensional diagrams of the cutting-blade portions used in an examination.
Figure 6B:
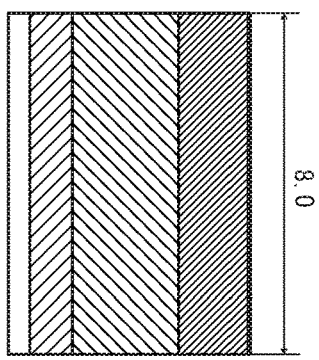

FIG. 5 shows the examination results of the expanded diameter sizes of the diameter expansion portion 4 when the number of the revolutions of the diameter expansion drill bit 20 and the grain size of the diamonds of the cutting-blade portions 31 are changed. In addition, FIGS. 6A and 6B are dimensional diagrams of the cutting-blade portions used in the examination. In this examination, the diameter expansion portion 4 is formed in the prepared-hole portion 3 in order to fix the post-installed anchor 100 of the nominal diameter M10.

As shown in FIG. 6A, each of the cutting-blade portions 31 has a cutting-blade surface at its position 6.65 mm away from the center of the diameter expansion drill bit 20 and has a clearance of 0.4 mm between the cutting-blade portion 31 and the prepared-hole portion 3. That is, the prepared-hole portion 3 has a diameter of 14.1 mm in this examination. Further, the movement size of the cutting-blade portions 31 due to a centrifugal force is 1.15 mm, and a value obtained by subtracting the above clearance from this movement size, i.e., 0.75 mm (1.15 mm-0.4 mm) becomes the maximum grinding depth of the diameter expansion portion 4. However, the examination results of FIG. 5 show that the maximum expanded diameter size was actually 1.7 mm (the maximum grinding depth was 0.85 mm) due to the manufacturing errors of the cutting-blade portions 31 or the like.

Here, the weight of (one of) the cutting-blade portions 31 measured 1.91 g (0.00191 Kg), and the turning radius thereof (the radius from the center of the diameter expansion drill bit 20 to the center of the gravity thereof) measured 5.7 mm (0.0057 m).

In addition, the examination was conducted using the nine types of cutting-blade portions in which the diamonds have a grain size of 100-120 mesh to 16-18 mesh as the cutting-blade portions 31. On the other hand, the diameter expansion drill bit 20 rotated and drove (the electric drill 11 drove) for 10 seconds in consideration of operation efficiency. Further, the cutting-blade portions by which the diameter expansion portion 4 having an expanded diameter size of 0.3 mm or more was formed in 10 seconds were used as appropriate cutting-blade portions. That is, it is necessary to have a cutting depth of at least 0.15 mm such that the post-installed anchor 100 is caught in the formed diameter expansion portion 4 (which was confirmed by another experiment (Note that the cutting depth may be 0.25 mm in expectation of a safety ratio considering the homogeneity of concrete)).

As shown in the examination results of FIG. 5, the expanded diameter size was increased with an increase in the number of the revolutions of the diameter expansion drill bit 20. That is, the expanded diameter size was increased with an increase in the angular speed. In addition, the expanded diameter size was increased with an increase in the grain size of the diamonds.

Specifically, none of the cutting-blade portions 31 did not achieve an expanded diameter size of 0.3 mm or more at a low revolution speed of 2000 rpm. At a revolution speed of 2500 rpm, the cutting-blade portions 31 in which the diamonds have a grain size of 20-30 mesh to 16-18 mesh achieved an expanded diameter size of 0.3 mm or more. At a revolution speed of 3000 rpm, the cutting-blade portions 31 in which the diamonds have a grain size of 60-80 mesh to 16-18 mesh achieved an expanded diameter size of 0.3 mm or more. At a revolution speed of 3500 rpm, the cutting-blade portions 31 in which the diamonds have a grain size of 80-100 mesh to 16-18 mesh achieved an expanded diameter size of 0.3 mm or more. Moreover, at a revolution speed of 4000 rpm (or more), all the cutting-blade portions 31 achieved an expanded diameter size of 0.3 mm or more.

As a result, the diameter expansion drill bit 20 appropriately rotates at 2500 rpm or more and preferably rotates at 3000 rpm or more. In addition, the diamonds have a grain size of 100-120 mesh to 16-18 mesh and preferably have a grain size of 50-60 mesh to 16-18 mesh in consideration of cutting efficiency and costs. On the other hand, the electric drill 11 that rotates the diameter expansion drill bit 20 rotates at 40000 rpm at a maximum as a commercially-available product. In consideration of usability, operation efficiency, and costs, the electric drill 11 preferably rotates at 15000 rpm or so.

Accordingly, the diameter expansion drill bit 20 appropriately rotates at 2500 rpm or more and 40000 rpm or less and more preferably rotates at 9000 rpm or more and 20000 rpm or less. In addition, the diamonds of the cutting-blade portions 31 appropriately have a grain size of 100-120 mesh or more and 16-18 mesh or less and more preferably have a grain size of 50-60 mesh or more and 16-18 mesh or less. Note that the diameter expansion drill bit 20 rotated and drove for 10 seconds in consideration of operation efficiency in this examination. However, the diameter expansion drill bit 20 is preferably allowed to rotate and drive for five seconds to 20 seconds.

Meanwhile, when consideration is given to the relationship between the number of the revolutions of the diameter expansion drill bit 20 and a centrifugal force applied to the cutting-blade portions 31, the centrifugal force F[N] applied to the cutting-blade portions 31 is expressed as $$F=mr\omega^2 \qquad (1)$$

where m[Kg] represents a weight, r[m] represents a turning radius, and ω[rad/s] represents an angular speed.

In addition, ω[rad/s] representing an angular speed is expressed as $$\omega=2\pi f \qquad (2)$$

where f[Hz=1/s] represents the number of revolutions. Accordingly, the centrifugal force is expressed as $$F=mr(2\pi f)^2 \qquad (2)$$

based on the above formulae (1) and (2).

Here, m is 1.91 g (0.00191 Kg), and r is 5.7 mm (0.0057 m). Therefore, a centrifugal force of 0.75 N is applied to the cutting-blade portions 31 when the diameter expansion drill bit 20 rotates at 2500 rpm, and a centrifugal force of 1.1 N is applied to the cutting-blade portions 31 when the diameter expansion drill bit 20 rotates at 3000 rpm. That is, when the centrifugal force is set at 0.75 N representing a minimum value and more preferably set at 1.1 N, the diameter expansion portion 4 can be appropriately formed in the prepared-hole portion 3 in a short time.

The anchor hole 1 formed in this examination was dedicated to the post-installed anchor 100 of the M10 size that represents a metal expansion anchor. For anchor holes dedicated to the post-installed anchors of the M10 size or larger, it is possible to apply a centrifugal force larger than the above one with the structure of the diameter expansion drill bit 20. In addition, for anchor holes dedicated to the post-installed anchors 100 of the M9 size and the M6 size, it is preferable to apply a centrifugal force larger than the above one with the adjustment of the number of the revolutions or the like.

That is, for anchor holes (of general sizes) dedicated to the post-installed anchors of the M10 size or larger, a cutting depth of 0.15 mm or more (an expanded diameter size of 0.3 mm or more) is obtained in such a manner that a centrifugal force applied to the cutting-blade portions 31 (cutting-blade surfaces) is set at a minimum value of 0.75 N and more preferably set at 1.1 N. When the post-installed anchor 100 is fixed to (the spread pieces 112 are brought into press-contact with) the anchor hole 1 having the diameter expansion portion 4 thus formed, the post-installed anchor 100 is caught in the diameter expansion portion 4.

1 Anchor hole
2 Fixing portion
3 Prepared-hole portion
4 Diameter expansion portion
5 Annular step portion
10 Diameter expansion device
11 Electric drill
20 Diameter expansion drill bit
21 Bit portion
22 Shaft portion
31 Cutting-blade portion
32 Cutting-blade holding portion
100 Post-installed anchor
111 Anchor main-body
112 Spread piece
113 Cone portion

What is claimed is:

1. A method for forming an anchor hole for a post-installed anchor in which a diameter expansion drill bit inserted in a prepared-hole portion bored in a concrete fixing body is rotated and a plurality of cutting-blade portions of the diameter expansion drill bit is moved in a radial direction and in direction different from each other by a centrifugal force to grind a part of the prepared-hole portion to form a diameter expansion portion, wherein
   a minimum value of the centrifugal force applied to grind the diameter expansion portion is 0.75 N.

2. The method for forming the anchor hole according to claim 1, wherein
   the minimum value of the centrifugal force applied to grind the diameter expansion portion is 1.1 N.

3. The method for forming the anchor hole according to claim 1, wherein
   the diameter expansion drill bit rotates at from 2500 rpm to 40000 rpm.

4. The method for forming the anchor hole according to claim 3, wherein
   the diameter expansion drill bit rotates at from 9000 rpm to 20000 rpm.

5. The method for forming the anchor hole according to claim 1, wherein
   the diameter expansion drill bit rotates and drives for from five seconds to 20 seconds to form the diameter expansion portion.

6. The method for forming the anchor hole according to claim 1, wherein
   each cutting-blade portion is constituted by a diamond cutting-blade having a grain size of from 100-120 mesh to 16-18 mesh.

7. The method for forming the anchor hole according to claim 6, wherein
   each cutting-blade portion is constituted by a diamond cutting-blade having a grain size of from 50-60 mesh to 16-18 mesh.

* * * * *